(12) United States Patent
Groff et al.

(10) Patent No.: US 7,991,971 B2
(45) Date of Patent: Aug. 2, 2011

(54) STATE MANAGEMENT FOR TRANSACTIONAL BACKUP CONSISTENCY

(75) Inventors: Dana D. Groff, Redmond, WA (US); James E. Johnson, Bellevue, WA (US); Jonathan M. Cargille, Seattle, WA (US); Norbert P. Kusters, Redmond, WA (US); Ran Kalach, Bellevue, WA (US); Surendra Verma, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 266 days.

(21) Appl. No.: 11/515,557

(22) Filed: Sep. 5, 2006

(65) Prior Publication Data

US 2007/0072163 A1    Mar. 29, 2007

Related U.S. Application Data

(60) Provisional application No. 60/716,024, filed on Sep. 9, 2005.

(51) Int. Cl.
*G06F 13/00* (2006.01)

(52) U.S. Cl. ......... 711/162; 711/111; 711/147; 711/156

(58) Field of Classification Search .................. 711/111, 711/147, 156, 162
See application file for complete search history.

(56) References Cited

U.S. PATENT DOCUMENTS

| | | | | |
|---|---|---|---|---|
| 4,498,145 A * | 2/1985 | Baker et al. .......................... 1/1 | | |
| 5,799,322 A | 8/1998 | Mosher, Jr. | | |
| 5,799,323 A | 8/1998 | Mosher, Jr. et al. | | |
| 5,826,239 A * | 10/1998 | Du et al. .......................... 705/8 | | |
| 5,923,833 A * | 7/1999 | Freund et al. .................... 714/19 | | |
| 6,073,128 A | 6/2000 | Pongracz et al. | | |
| 6,522,631 B2 | 2/2003 | Rosborough et al. | | |
| 6,557,082 B1 | 4/2003 | Josten et al. | | |
| 6,564,215 B1 | 5/2003 | Hsiao et al. | | |
| 6,718,361 B1 * | 4/2004 | Basani et al. .................. 709/201 | | |
| 6,748,447 B1 * | 6/2004 | Basani et al. .................. 709/244 | | |
| 6,877,016 B1 | 4/2005 | Hart et al. | | |
| 7,168,001 B2 * | 1/2007 | Johnson et al. .................. 714/13 | | |
| 2003/0055805 A1 * | 3/2003 | Gardner ........................... 707/1 | | |
| 2003/0093443 A1 | 5/2003 | Huxoll | | |

(Continued)

FOREIGN PATENT DOCUMENTS

EP    0836160 A2    4/1998

(Continued)

OTHER PUBLICATIONS

International Search Report dated Jan. 22, 2007 for Application No. PCT/US2006/035228, 10 pages.

(Continued)

*Primary Examiner* — Reba I Elmore

(57) ABSTRACT

Aspects of the subject matter described herein relate to transactions. In aspects, a consistency requester such as a shadow copy service requests to have a consistent view of a set of resources. In response, transactions that are in a problematic state are allowed to exit the problematic state while new and existing transactions that are not in the problematic state are allowed to perform any work except work that takes them into the problematic state. After no transactions are in the problematic state, a consistent view of the set of resources is available. This view may be used by the consistency requester as desired. Afterwards, the consistency requester may indicate that a consistent view is no longer needed. Transactions are then allowed to enter the problematic state. Transactions may also be allowed to enter the problematic state if a timeout elapses.

20 Claims, 7 Drawing Sheets

U.S. PATENT DOCUMENTS

| | | | |
|---|---|---|---|
| 2003/0101321 A1 | 5/2003 | Ohran | |
| 2004/0068501 A1* | 4/2004 | McGoveran | 707/8 |
| 2004/0148477 A1 | 7/2004 | Cochran | |
| 2005/0010732 A1 | 1/2005 | Boyd et al. | |
| 2005/0015425 A1* | 1/2005 | Kumar et al. | 709/200 |
| 2005/0027749 A1 | 2/2005 | Ohno et al. | |
| 2005/0050287 A1 | 3/2005 | Boyd et al. | |
| 2005/0144170 A1* | 6/2005 | Wiser et al. | 707/8 |
| 2007/0072163 A1* | 3/2007 | Groff et al. | 434/322 |

FOREIGN PATENT DOCUMENTS

| | | |
|---|---|---|
| GB | 2335516 | 9/1999 |
| WO | WO03090082 A2 | 10/2003 |

OTHER PUBLICATIONS

Green; et al., "Designing a Fast, On-line Backup System for a Log-structured File System", Digital Technical Journal vol. 8 No. 2 1996, pp. 32-45, http://academic.research.microsoft.com/Paper/111990.

Moh, Chuang-Hue, "Snapshots in a Distributed Persistent Object Storage System", Massachusetts Institute of Technology May 2003.

"Storage Solutions for Oracle Database: Snapshot Backup and Recovery with IBM Total Storage Enterprise Storage Server", 2002, http://www-03.ibm.com/systems/resources/systems_storage_disk_ess_pdf OracleNT-SMBR.pdf.

* cited by examiner

--PRIOR ART--

STATE MANAGEMENT FOR TRANSACTIONAL BACKUP CONSISTENCY

CROSS REFERENCE TO RELATED APPLICATION

This application claims the benefit of U.S. Provisional Application No. 60/716,024, filed Sep. 9, 2005, entitled TRANSACTIONAL BACKUP CONSISTENCY USING SNAPSHOTS WITH COMMIT DRAINING AND RECOVERED RESOURCES, which application is incorporated herein in its entirety.

BACKGROUND

When taking a backup of a system, resources on the system may be involved in transactions. To create a backup, a shadow copy may be created of the storage upon which the resources are stored. The shadow copy may then be used to make the backup. Taking a shadow copy of storage involved in transactions, however, may yield an image that has inconsistent data.

SUMMARY

Briefly, aspects of the subject matter described herein relate to transactions. In aspects, a consistency requester such as a shadow copy service requests to have a consistent view of a set of resources. In response, transactions that are in a problematic state are allowed to exit the problematic state while new and existing transactions that are not in the problematic state are allowed to perform any work except work that takes them into the problematic state. After no transactions are in the problematic state a consistent view of the set of resources is available. This view may be used by the consistency requester as desired. Afterwards, the consistency requester may indicate that a consistent view is no longer needed. Transactions are then allowed to enter the problematic state. Transactions may also be allowed to enter the problematic state if a timeout elapses.

This Summary is provided to briefly identify some aspects of the subject matter that is further described below in the Detailed Description. This Summary is not intended to identify key or essential features of the claimed subject matter, nor is it intended to be used to limit the scope of the claimed subject matter.

The phrase "subject matter described herein" refers to subject matter described in the Detailed Description unless the context clearly indicates otherwise. The term "aspects" should be read as "at least one aspect." Identifying aspects of the subject matter described in the Detailed Description is not intended to identify key or essential features of the claimed subject matter.

The aspects described above and other aspects of the subject matter described herein are illustrated by way of example and not limited in the accompanying figures in which like reference numerals indicate similar elements and in which:

DETAILED DESCRIPTION

Exemplary Operating Environment

Figure 1:
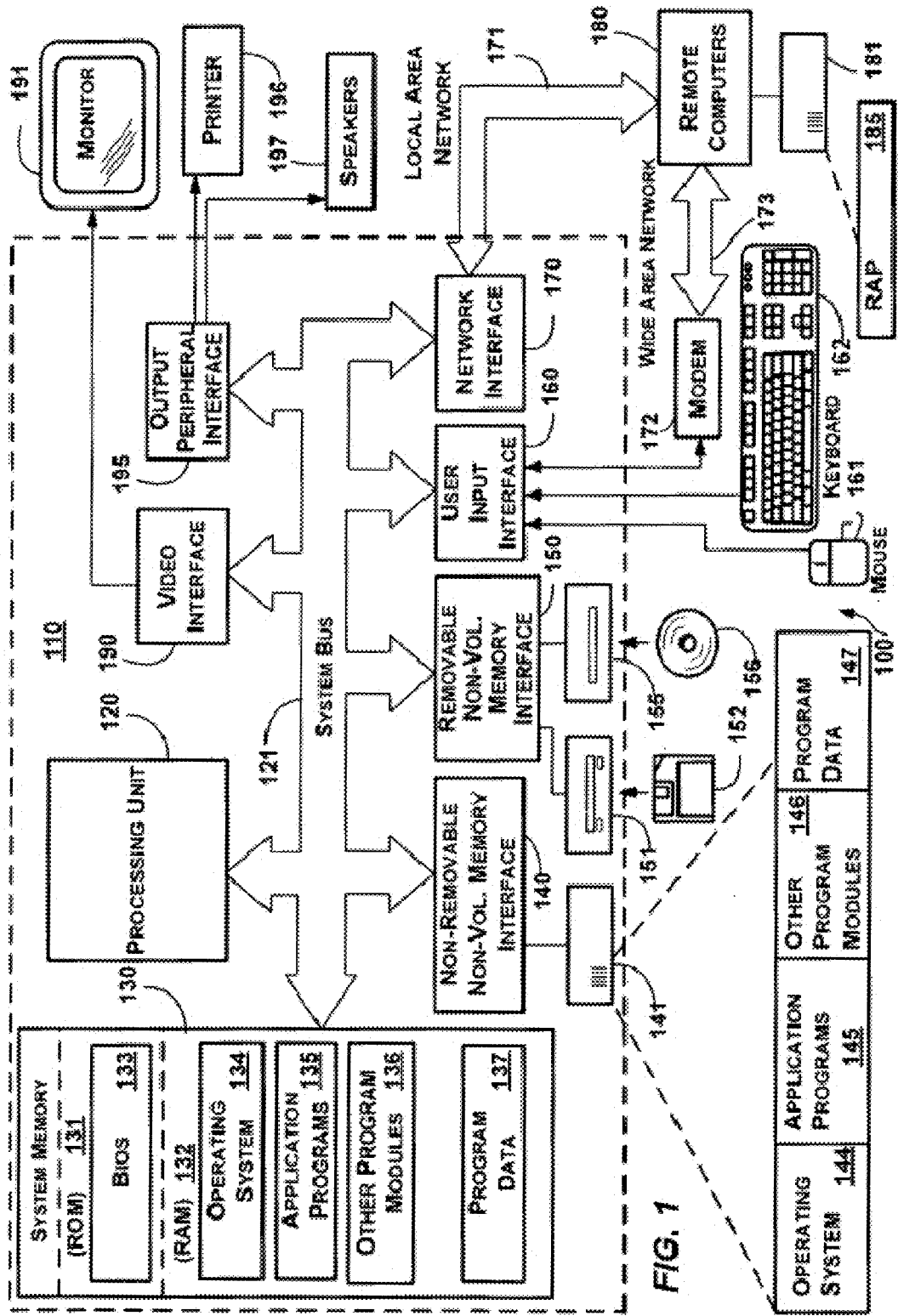
FIG. 1 is a block diagram representing an exemplary general-purpose computing environment into which aspects of the subject matter described herein may be incorporated.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general purpose or special purpose computing system environments or configurations. Examples of well known computing systems, environments, and/or configurations that may be suitable for use with aspects of the subject matter described herein include, but are not limited to, personal computers, server computers, handheld or laptop devices, multiprocessor systems, microcontroller-based systems, set top boxes, programmable consumer electronics, network PCs, minicomputers, mainframe computers, distributed computing environments that include any of the above systems or devices, and the like.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing aspects of the subject matter described herein includes a general-purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 110. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, a touch-sensitive screen of a handheld PC or other writing tablet, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Transactions

Figure 2:
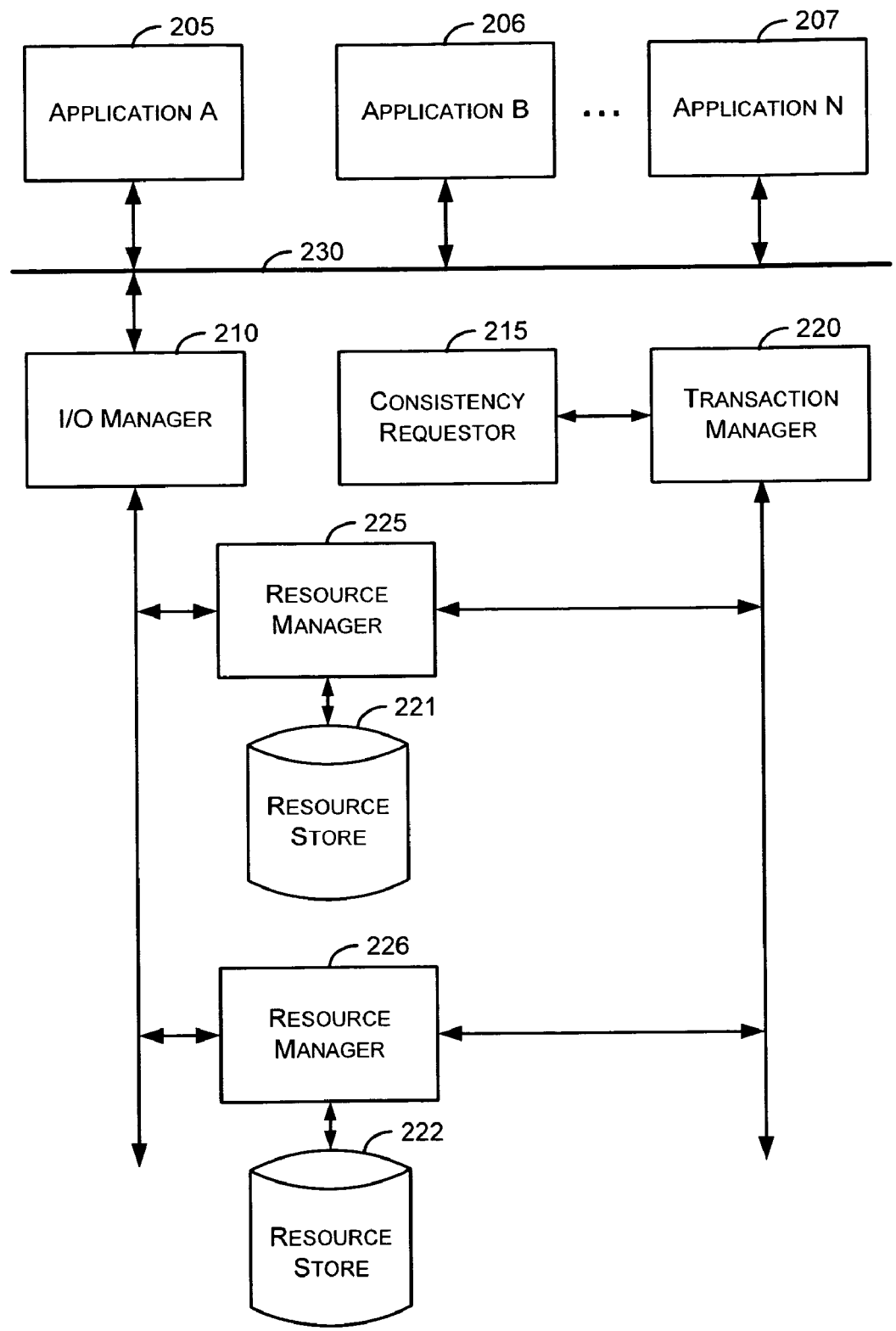
FIG. 2 is a block diagram representing an exemplary arrangement of components of a system in which aspects of the subject matter described herein may operate.

FIG. 2 is a block diagram representing an exemplary arrangement of components of a system in which aspects of the subject matter described herein may operate. In one embodiment, the system includes applications 205-207, I/O manager 210, consistency requestor 215, transaction manager 220, resource stores 221 and 222, and resource managers 225 and 226. In other embodiments, there may be more or fewer applications 205-207, more or fewer resource stores 221 and 222, and more or fewer resource managers 225 and 226. In yet other embodiments, there may be a hierarchy of transaction managers as described in more detail below.

The applications 205-207 include any processes that may use transactions to create, delete, or update resources. Such processes may execute in user mode or kernel mode. The applications 205-207 may make file system requests (e.g., via function/method calls) through the API 230 to the I/O manager 210. The I/O manager 210 may determine what I/O request or requests to issue to the resource managers 225-226 to fulfill each request. The I/O manager 210 may also return data to the applications 205 as operations associated with the file system requests proceed, complete, or fail. When a file system request involves a transaction, the transaction manager 220 may be informed so that it may properly manage the transaction.

In one embodiment, a transaction is a group of operations that have the following properties: atomic, consistent, isolated, and durable. In other embodiments, a transaction may comprise a group of operations with one or more of the above properties.

Atomic indicates that either every operation in the group succeeds, or the tangible effects (e.g., file changes) of the operations in the group are undone (also known as rolled back). For example, a bank transfer may be implemented as an atomic set of two operations: a debit from one account and a credit to another account. If the two operations do not both succeed, then the transfer is either unfairly in favor of the bank or the account holder. Thus, either both should succeed in a transaction or the tangible effects (e.g., data stored to disk or memory) of any that did succeed should be undone.

Consistent means that if the data is consistent before the transaction begins, then it will be consistent after the transaction finishes. In the bank transfer example above, consistency may be defined as having the combined account balance of the two accounts be a constant. To implement consistency in the bank transfer example, the debit and credit operations simply need to be for the same amount of money and either both be completed or neither completed on each account.

Isolated means that the work done within a transaction that is in progress cannot be seen by threads or processes performing work associated with other transactions or outside the transaction. For example, in an update, an electronic commerce site may need to have a new product category navigation page appear at the same time as the product detail pages that describe the new products. If the navigation page appeared before the product detail pages, this might cause missing pages for a customer who is currently shopping using the navigation page. Having the navigation page and the product detail pages appear at the same time may be implemented by updating and adding multiple files and directory entries under the control of a transaction.

Durability means that after an update is finished, its effects persist even if the system stops responding (e.g., because of a power outage). In the electronic commerce site example, durability can be provided by writing the updates to nonvolatile storage such as a hard disk.

Each of the resource managers 225 and 226 provide a transactional view of a set of resources managed by the corresponding resource manager. The set of resources a resource manager manages may include files and directories on one or more disk volumes, a general-purpose database, a specialized database such as a registry, flat file, XML file, HTML file, and the like, one or more data structures stored in volatile or non-volatile memory, any subset, combination, or permutation of the above, and the like. For example, a resource manager may manage all or a subset of the files and directories of a volume. As another example, a resource manager may manage all or a portion of a registry. As yet another example, a resource manager may manage a set of data structures that are stored on disk. Many other examples will be apparent to those skilled in the art.

For each transaction for which a resource manager is interested, the resource manager enlists with the transaction manager 220 to receive messages related to the transaction. After enlisting for a transaction, the resource manager receives transaction messages from the transaction manager 220 such as prepare, commit, rollback, and so forth. The resource manager may vote as to whether a transaction may commit or rollback. For example, in response to a prepare message, a resource manager may not be able to store information to disk to prepare for the commit as needed. Consequently, the resource manager may inform the transaction manager 220 of this problem by voting that the transaction be rolled back.

A resource manager may be volatile or durable. A durable resource manager persists data on durable storage so that if the resource manager crashes or otherwise stops functioning, the resource manager may recover the state of all pending transactions upon recovery. A resource manager may store a log or set of versions of resources on nonvolatile storage that allows the resource manager to undo or redo transaction work if needed. A volatile resource manager may store data in volatile memory.

The transaction manager 220 coordinates transaction actions with enlisted resource managers. In one embodiment, the transaction manager 220 initiates a two-phase commit protocol when an application requests that a transaction commit. In the two-phase commit protocol, after it receives a request to commit a transaction, the transaction manager 220 asks each enlisted resource manager if it is prepared to commit or rollback the transaction. If a resource manager is unable to prepare to commit or rollback, the resource manager may vote to rollback the transaction by informing the transaction manger 220. If the transaction manager 220 receives a rollback vote, the transaction manager 220 may then send a rollback command to each resource manager enlisted in the transaction.

After each resource manager has indicated that it is prepared to commit the transaction, the transaction manager 220 may write a commit record in nonvolatile storage and may then ask each enlisted resource manager to commit the transaction. After receiving a commit request, each resource manager may write a commit record in its log file and perform any other actions needed to complete the transaction.

At any point in time, a snapshot view of two or more resource managers may compromise the atomicity of an active transaction. For example, if a transaction involves moving a file from a volume managed by one resource manager (e.g., volume D) to a volume managed by another resource manager (e.g., volume E), the file may be deleted from the volume D and created on the volume E. If a process (e.g., a backup application) looks at the volumes after a commit record is written in a log associated with volume D but before a commit record is written in a log associated with volume E, the process may get an inconsistent state for the file (e.g., deleted from D and not created on E). This may cause data loss.

To obtain a view of a set of resources in a consistent state, the consistency requester 215 may make a request (e.g., freeze) to the transaction manager 220. In response, the transaction manager 220 may allow applications to perform additional operations on the set of resources including any transactional work except transaction work that causes a problematic state as described in more detail below. An application that has a transaction in the problematic state at the time the request is made is allowed to do further transactional work regarding the transaction to exit the problematic state.

After there are no transactions that are in the problematic state, the transaction manager 220 may inform the consistency requester 215 that a consistent set of resources is available. At this point, the consistency requester 215 may perform whatever operation it desires knowing that the set of resources is in a consistent state. One exemplary operation that the consistency requestor 215 may perform is to create a shadow copy (e.g., a point in time snapshot) of the set of resources. After the consistency requester 215 completes any operations it desires to perform, the consistency requester 215 may inform the transaction manager 220, which may then allow transactions to proceed into the problematic state.

A timeout may be imposed on how long the transaction manager 220 may wait until all transactions have left the problematic state. The timeout may be selectable by the consistency requester, a system administrator, user, or the like, or may be hard-coded in the transaction manager 220 or elsewhere. If a time corresponding to the timeout elapses after the request for consistency is received, the transaction manager 220 may inform the consistency requester 215 that no consistent view of the set of resources is available and may indicate the reason (e.g., timeout).

Figure 3:
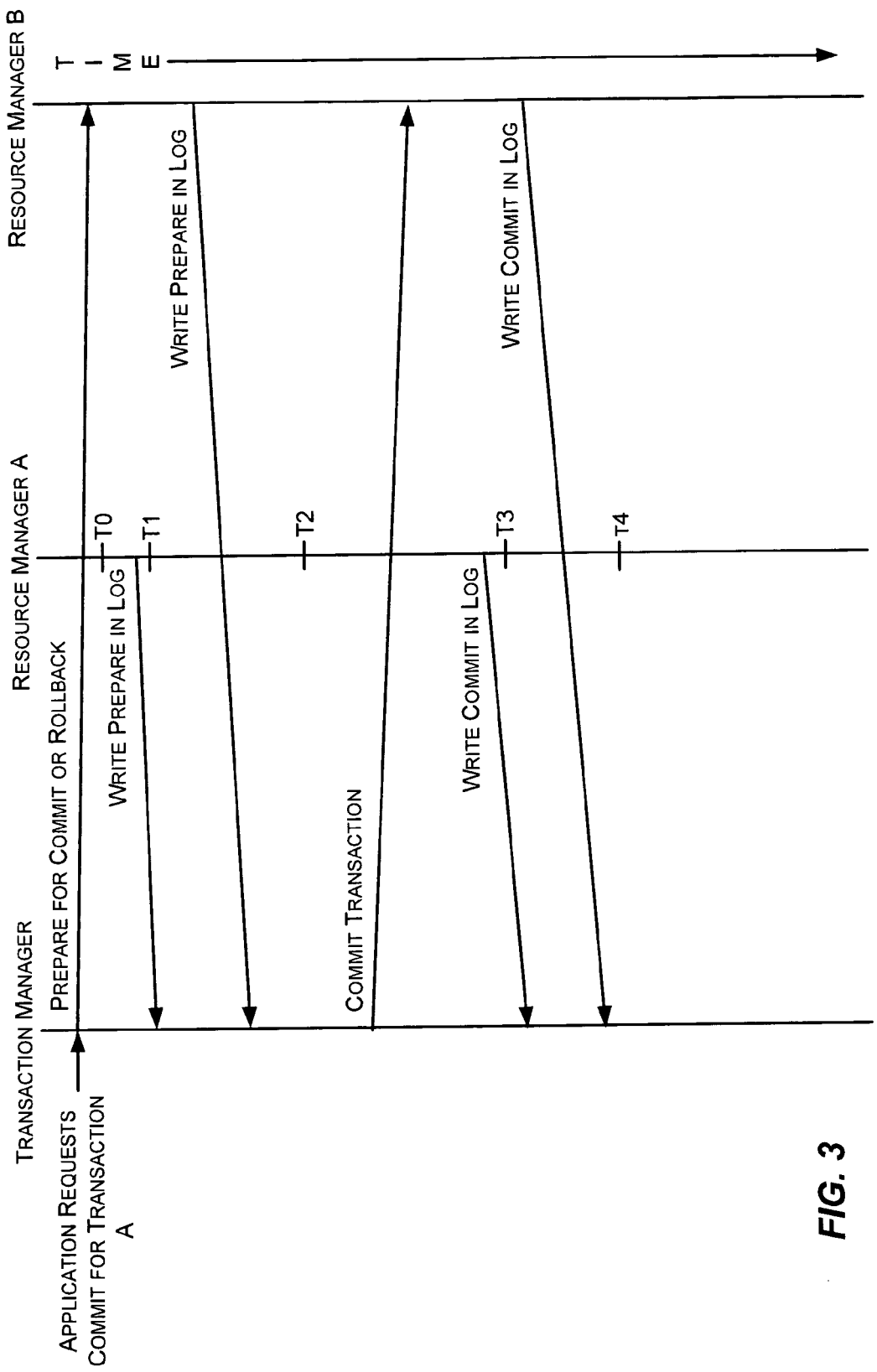
FIG. 3 is a timing diagram representing actions that may occur in committing a transaction in accordance with aspects of the subject matter described herein.

FIG. 3 is a timing diagram representing actions that may occur in committing a transaction in accordance with aspects of the subject matter described herein. An application requests a commit for a transaction T1. In response, the transaction manager notifies the resource manager A and the resource manager B to prepare to commit or rollback.

In response, the resource managers (A and B) take any needed actions to prepare for a commit or rollback of the transaction. For example, they may flush data to disk.

After a resource manager is prepared for a commit or rollback, it may write a prepare record in a log file. After writing the prepare record, a resource manager may inform the transaction manager that the resource manager is prepared.

After the transaction manager receives messages that indicate that each of the resource managers is prepared, the transaction manager may then request that each resource manager commit the transaction. Note that if the transaction manager receives a vote to rollback the transaction or if a timeout expires before receiving all messages, the transaction manager may instead tell each resource manager to rollback the transaction.

After a resource manager has done all needed work to commit the transaction, the resource manager writes a commit in its log file and sends notification to the transaction manager that the resource manager has committed the transaction.

If the resource managers need to recover at time T1 or T2, an inconsistent state may occur if the transaction manager is not available. During recovery, if the transaction manager is available, the transaction manager may be consulted to determine the final outcome of the transaction (e.g., committed or rollback). If the transaction manager is not available the transaction is considered "in-doubt" and would remain so until the transaction manager is made available.

In one embodiment, instead of counting on or waiting for the transaction manager to become available (which in some cases may never occur), the resource managers may apply rules during recovery to dictate the final outcome of the transaction. One exemplary rule is to have any transaction that has a prepare record but no commit record to be rolled back. Another rule is to have any transaction that has a prepare record but no commit record to be committed.

Under the first rule above, if the resource managers A and B recover at time T3, the transaction work on resource manager A would remain committed while the transaction work on the resource manager B would be rolled back. Under the second rule above, if the resource managers A and B recover at time T1, the transaction work on resource manager A would be committed while the transaction work on resource manager B (if any) would be rolled back. Both of these states are problematic as the recovery produces an inconsistent state.

On the other hand, under the first rule above, if the resource managers A and B recover at time T1, the transaction work on the resource managers A and B is rolled back and the recovery produces a consistent state. Similarly, under the second rule above, if the resource managers A and B recover at time T3, during recovery, the transaction work on the resource manager B is committed and the recovery produces a consistent state.

Under either rule, if recovery occurs at time T0, T2, or T4, the recovery produces a consistent state.

In an embodiment, a consistent shadow copy of a set of resources may be created by preventing any new transactions from entering problem states, waiting until all currently pending transactions are out of problem states, creating a shadow copy after all currently pending transactions are out of problem states, and applying one of the rules above in performing a recovery of the shadow copy without transaction manager involvement.

Logically, a shadow copy is a duplicate of a set of resources at a given point in time, even though the set of resources may not be entirely copied (e.g., via copy-on-write) in creating the shadow copy. A shadow copy may be viewed in a separate volume by the operating system and any executing applications. For example, a shadow copy may have a volume device, a volume name, a drive letter, a mount point, and any other attribute of an actual volume.

Figure 4:
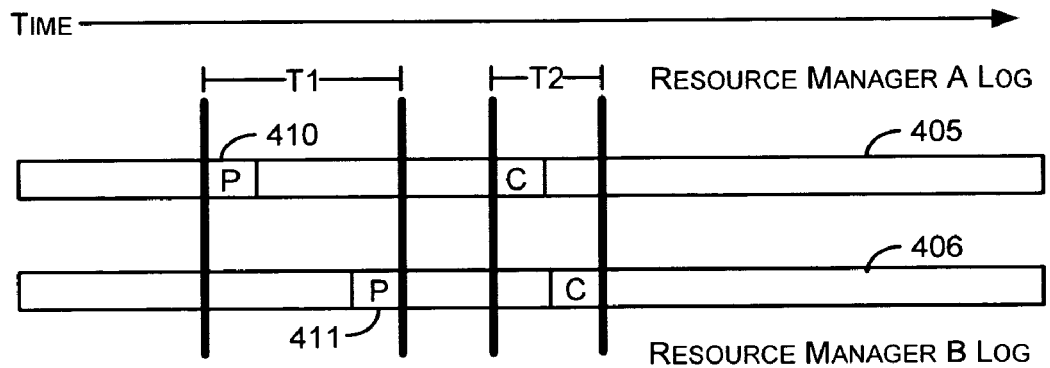
FIG. 4 is a block diagram that generally represents log files of two resource managers in accordance with aspects of the subject matter described herein.

FIG. 4 is a block diagram that generally represents log files of two resource managers in accordance with aspects of the subject matter described herein. The log files 405 and 406 are written to by resource managers A and B, respectively, to log work done on transactions.

When the resource manager A finishes preparing to commit or rollback, the resource manager A writes a prepare record 410 to the log file 405. Similarly, when the resource manager B finishes preparing to commit or rollback, the resource manager B writes a prepare record 411 to the log file 406.

When the resource manager A finishes committing a transaction, the resource manager A writes a commit record to the log file 405. Similarly, when the resource manager B finishes committing a transaction, the resource manager B writes a commit to the log file 406.

Depending on the recovery rule followed, if a shadow copy is taken during the periods T1 or T2, inconsistent data may result.

Figure 5:
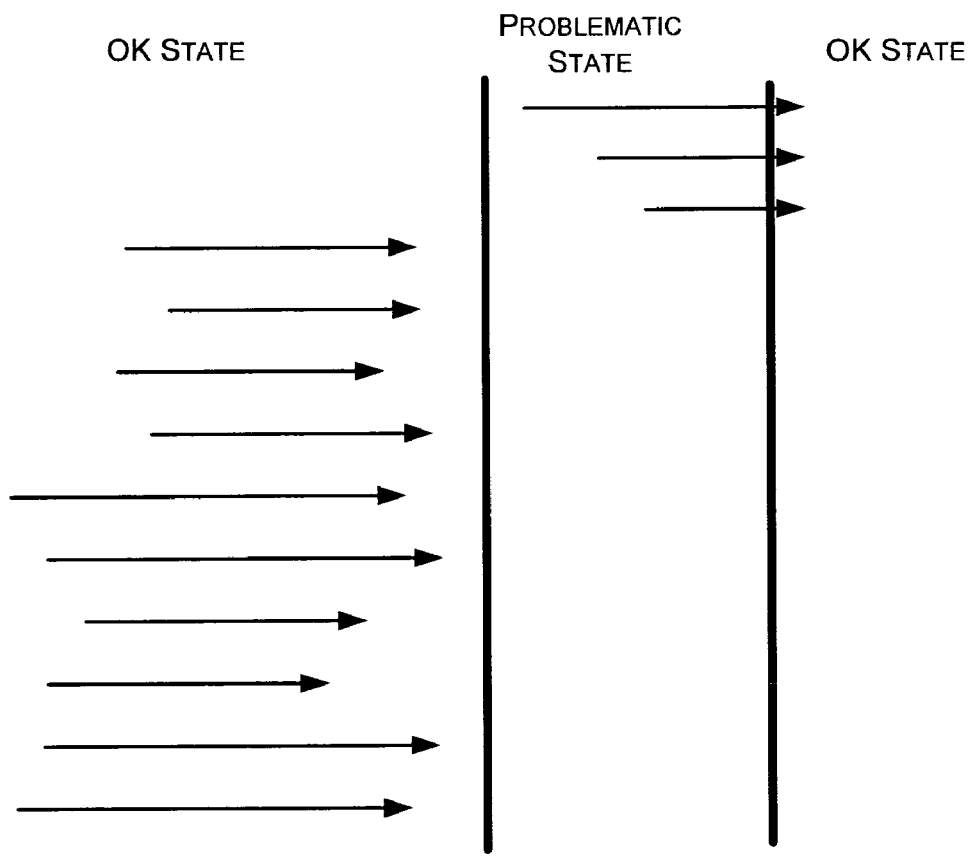
FIG. 5 is a block diagram that generally represents a set of transactions that are proceeding in accordance with aspects of the subject matter described herein.

FIG. 5 is a block diagram that generally represents a set of transactions that are proceeding in accordance with aspects of the subject matter described herein. When a consistency requester (not shown) requests a consistent view of a set of resources, transactions (represented by lines with arrows) may be in various states. A set of transactions may be in problematic states while one or more of another set of transactions may either not exist or be in a non-problematic state.

After the consistency requester requests a consistent state, the transaction manager prevents any transactions from entering a problematic state and waits until transactions that are already in the problematic state have transitioned into the OK state. If the transactions in a problematic state do not transition to a non-problematic state within a timeout period, the transaction manager may inform the consistency requestor that a consistent state is not available. After the consistency requester has done whatever it wants to with the consistent view (e.g., performed a shadow copy), the consistency requestor may inform the transaction manager that it no longer needs a consistent view. After it has been informed that a consistent view is no longer needed or after the timeout period has elapsed, the transaction manager may again allow transactions to proceed to the problematic state.

Note that applications involved with transactions that are not in a problematic state may perform additional work as long as they do not attempt to enter into a problematic state. If they attempt to enter into a problematic state (e.g., by requesting to commit a transaction), the transaction manager may simply hold the request or not respond to the request until the consistency requestor indicates that a consistent view is no longer needed or until the timeout period elapses.

Although a few transactions have been represented in FIG. 5, in a computing environment, there may be tens, hundreds, thousands, fewer or more transactions that are currently pending at any point in time. Providing a consistent view of a set of resources associated with the transactions may be accomplished as described above.

Furthermore, a particular transaction may involve many resource managers. In such embodiments, a problematic state may be defined as a state in which different resource managers involved with the transaction are in different transaction states. In particular if the first rule above is used, a problematic state occurs when one or more resource managers involved in a transaction are in a prepare state and have written a prepare record to their logs while one or more other resource managers involved in the transaction are in a commit state and have written a commit record to their logs. If the second rule above is used, a problematic state occurs when one or more resource managers involved in a transaction are in a prepare state and have written a prepare record while one or more other resource managers involved in the transaction have not yet written a prepare record. In transactions with fewer or more states, the possible number of problematic states may diminish or increase as appropriate without departing from the spirit or scope of aspects of the subject matter described herein.

Figure 6:
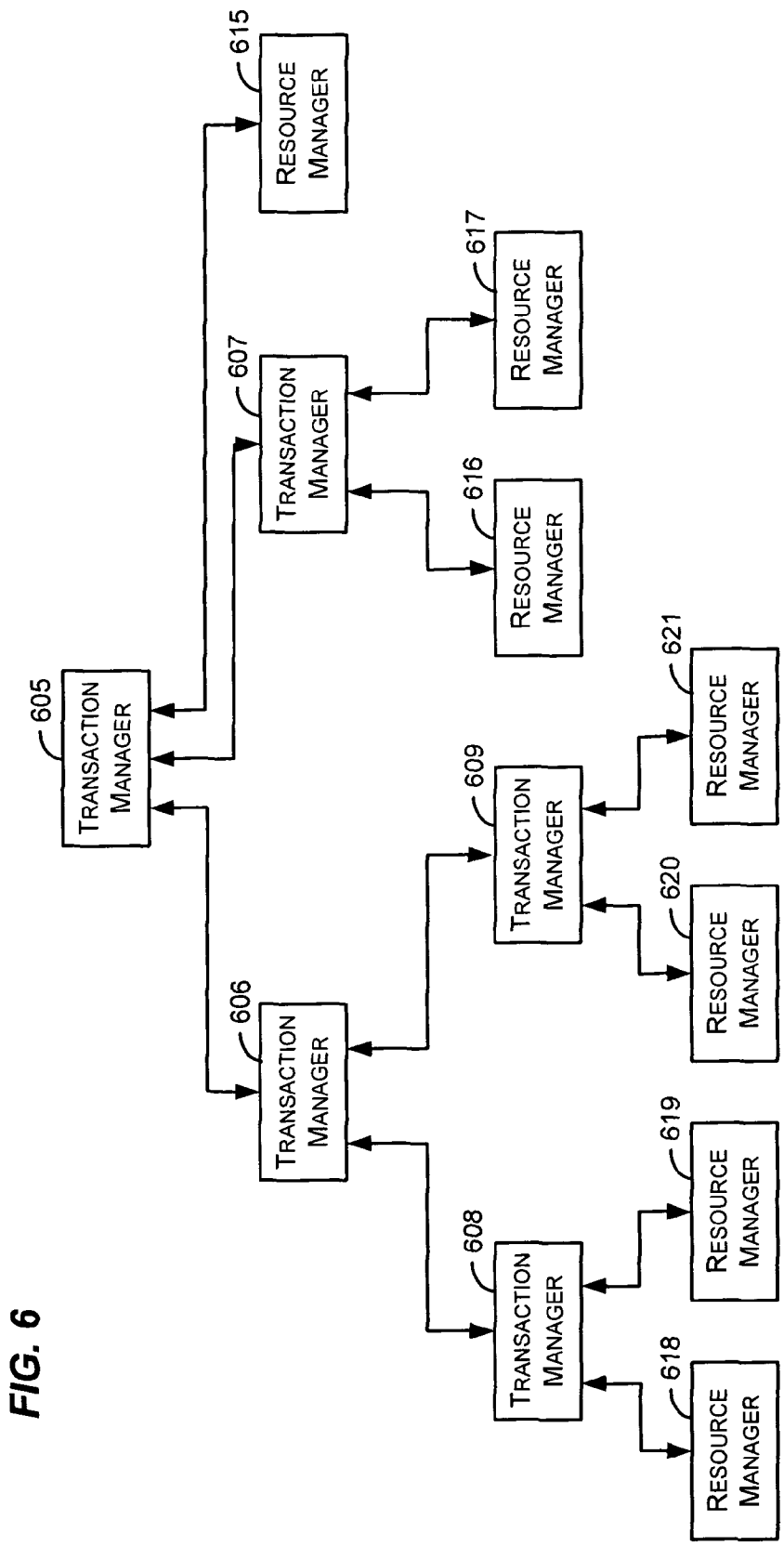
FIG. 6 is a block diagram that generally represents an exemplary hierarchy of components involved in a transaction in accordance with aspects of the subject matter described herein.

FIG. 6 is a block diagram that generally represents an exemplary hierarchy of components involved in a transaction in accordance with aspects of the subject matter described herein. As mentioned previously, in some embodiments, there may be a hierarchy of transaction managers involved in a transaction. For example, a transaction manager 605 may be the superior transaction manager to transactions that involve the transaction manager 606 and 607 and resource manager 615. Being a "superior" transaction manager means that the transaction manager determines when to notify its subordinate components of transaction events (e.g., prepare, commit, and so forth).

The transaction manager 606 may be the superior transaction manager to transactions that involve the transaction managers 608 and 609. The transaction manager 607 may manage transactions that involve the resource managers 616 and 617.

The transaction manager 608 may manage transactions that involve the resource managers 618 and 618 while the transaction manager 609 may manage transactions that involve the resource managers 620 and 621. More or fewer levels of hierarchy as well as more or fewer components at each level and a different configuration of components may be involved without departing from the spirit or scope of the subject matter described herein.

To obtain a consistent view of the resources that may be involved in transactions (indirectly and directly) involving the transaction manager 605, a consistency requester may submit a request (e.g., freeze) to the transaction manager 605. In response, on each of its subordinates, the transaction manager 605 prevents transactions from entering into problematic states while allowing transactions that are currently in a problematic state to proceed out of the problematic state.

In one embodiment, after the transactions that are associated with all the components at one level of the hierarchy have exited the problematic state, on each of their subordinates, transaction managers at that level prevent transactions from entering the problematic state while allowing transactions that are currently in a problematic state to proceed out of the problematic state. This continues until the last level of transaction managers is reached. When the last level is reached and all transactions in the last level in the problematic state have left the problematic state, a consistent view of the resources managed by components in the hierarchy is available to the consistency requester. In one embodiment, an overall or per-level timeout may be applied after which a failure to reach a consistent view may be reported to the consistency requestor.

After the consistency requester has completed whatever operations it desires, it may notify the transaction manager 605 (e.g., via a thaw notification) so that the transaction manager 605 may resume allowing transactions to enter the problematic state. In one embodiment, the transaction manager 605 notifies its subordinates which notify their subordinates and so forth. In another embodiment, the consistency requester may notify each transaction manager associated with the set of resources.

Figure 7A:
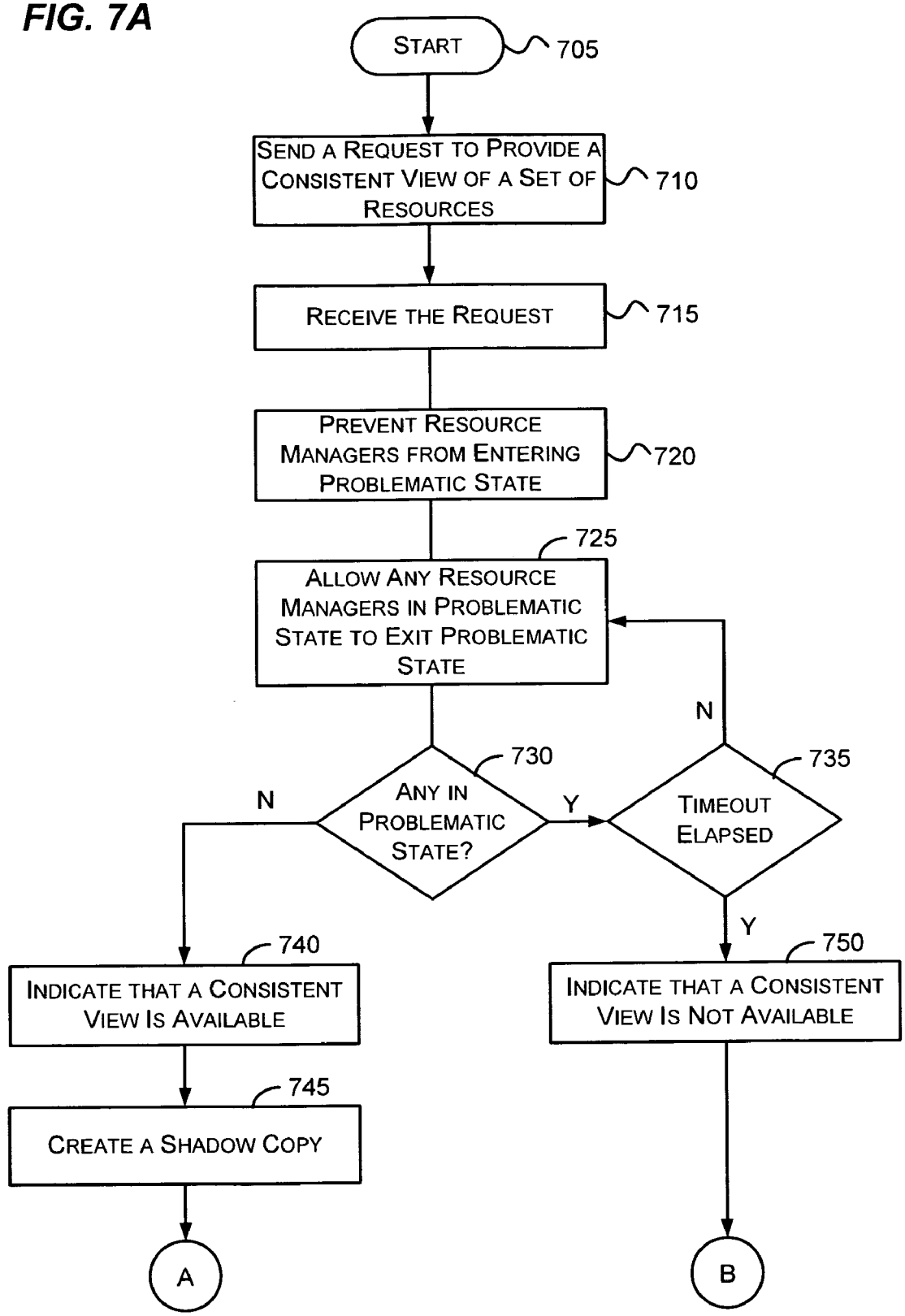
FIGS. 7A and 7B are a flow diagram that generally represents exemplary actions that may occur in obtaining a consistent view of a set of resources in accordance with aspects of the subject matter described herein.
Figure 7B:
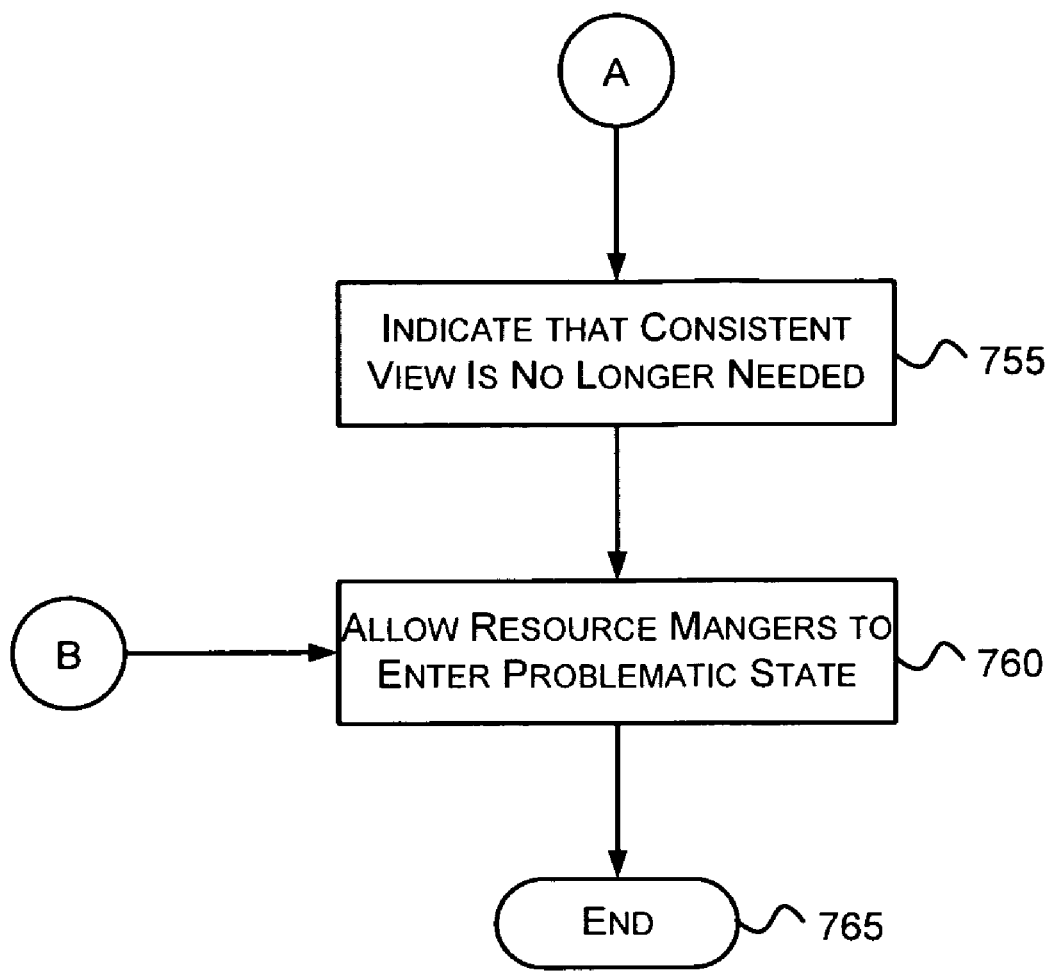

FIGS. 7A and 7B are a flow diagram that generally represents exemplary actions that may occur in obtaining a consistent view of a set of resources in accordance with aspects of the subject matter described herein. At block 705, the actions begin.

At block 710, a request is sent to provide a consistent view of a set of resources. For example, referring to FIG. 2, the consistency requester 215 may send a request to the transaction manager 220 to request a consistent view of resources included on the resource stores 221 and 222.

At block 715, the request is received. In one embodiment, the request is received by the transaction manager at the highest level of a hierarchy. In another embodiment, the request is received by a single transaction manager that is not in a hierarchy of other transaction managers.

At block 720, resource managers are prevented from entering the problematic state. Such resource managers may become involved in new transactions and may move forward existing transactions up to just before they enter the problematic state. For example, referring to FIG. 5, transactions in the OK state left of the first vertical line are allowed to proceed up to the first vertical line but no further. Transactions that are on the right of the second vertical line (if any) are allowed to proceed until completed.

At block 725, any resource managers involved in transactions in a problematic state are allowed to proceed with the transactions to exit the problematic state. For example, referring to FIG. 5, transaction managers in the problematic state between the two lines are allowed to proceed to an OK state.

In one embodiment, the actions associated with blocks 720 and 725 may be combined in one block and/or may be performed in parallel.

At block 730, a determination is made as to whether any of resource managers are involved in transactions in the problematic state. If so, the actions continue at block 735; otherwise, the actions continue at block 740.

At block 735, a determination is made as to whether a timeout has elapsed since receiving the request at block 715. If so, the actions continue at block 750; otherwise, the actions continue at block 725. The actions associated with blocks 725, 730, and 735 continue until either no resource managers are involved in transactions in the problematic state or until the timeout has elapsed.

At block 740, a message is sent that indicates that a consistent view is available. For example, referring to FIG. 2, the transaction manager 220 sends a message to the consistency requester 215 informing the consistency requestor 215 that a consistent view is available.

At block 745, the consistency requestor may perform an operation on the set of resources. One exemplary operation is to perform a shadow copy. After block 745, the actions continue at block 755 of FIG. 7B.

At block 750, a message is sent that indicates that a consistent view is not available. The message may also indicate that the timeout has elapsed. After block 750, the actions continue at block 760 of FIG. 7B.

At block 755, a message (e.g., thaw) is sent that indicates that a consistent view is no longer needed. For example, referring to FIG. 2, the consistency requester 215 may send a message to the transaction manager 220 that a consistent view is no longer needed. If it is part of a hierarchy of transaction managers, the transaction manager 220 may forward the message to each of its subordinate managers which may forward to each of their subordinate managers and so forth. In another embodiment, the consistency requestor 215 may send the message (e.g., thaw) to each of the transaction managers in the hierarchy.

At block 760, the resource managers are allowed to progress transgressions into the problematic state. For example, referring to FIG. 5, the transactions to the left of the first vertical line are allowed to progress into the problematic state.

At block 765, the actions end.

In one embodiment, the actions described in conjunction with FIGS. 6A and 6B are not all-inclusive of all the actions that may be taken in creating a consistent view. Furthermore, although the actions are described as occurring in a particular order, in other embodiments, some of the actions may occur in parallel, may be performed with other actions, or may be performed in another order without departing from the spirit or scope of the subject matter described herein. For example, the actions associated with blocks 720 and 725 may occur in parallel and the actions associated with block 750 and 760 may be reversed in order.

As can be seen from the foregoing detailed description, aspects have been described related to transactions. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. A computer-readable storage medium having computer-executable instructions, which when stored in a system memory of a computer and executed by a processing unit of the computer perform actions, comprising:

receiving a shadow copy service request to provide a consistent view of a set of resources managed by the computer, a first resource manager potentially involved in a transaction affecting at least one resource of the set of resources, the first resource manager executed at least in part by the processing unit;

allowing the first resource manager to enter the transaction after the shadow copy service request is received if the transaction would not cause the first resource manager to enter a problematic state that makes the view inconsistent;

preventing the first resource manager from entering into the transaction after the shadow copy service request is received if the transaction would cause the first resource manager to enter a problematic state that makes the view inconsistent;

creating a shadow copy of at least a first resource after the consistent view is available; and performing a recovery of the shadow copy.

2. The computer-readable storage medium of claim 1, comprising:

allowing the first resource manager to proceed without rollback if it is involved in a transaction that causes the first resource manager to be in a problematic state at a time that the shadow copy service request is made.

3. The computer-readable storage medium of claim 1, comprising:

preventing a second resource manager that is executed at least in part by the processing unit and is potentially involved in the transaction from entering a problematic state; and indicating in response to the shadow copy service request that the consistent view is available when at least the first and second resource managers are not in a problematic state that makes the view inconsistent.

4. The computer-readable storage medium of claim 1, a consistent view comprising a state in which no resource manager involved in the transaction is in a prepared state with respect to the transaction when another resource manager involved in the transaction is in a committed state with respect to the transaction.

5. The computer-readable storage medium of claim 1, a consistent view comprising a state in which no resource manager involved in the transaction is in a prepared state with respect to the transaction when another resource manager involved in the transaction is in a state preceding the prepared state with respect to the transaction.

6. The computer-readable storage medium of claim 1, comprising, after creating the shadow copy, allowing the first resource manager to enter into a problematic state with respect to the transaction.

7. The computer-readable storage medium of claim 1, performing a recovery comprising applying a rule to determine an outcome of a transaction if a transaction manager cannot be consulted to determine the outcome.

8. The computer-readable storage medium of claim 1, the problematic state defined by a rule that indicates a procedure to follow upon recovery.

9. The computer-readable storage medium of claim 8, the rule indicating that any resource manager having the transaction in a prepared state rolls back the transaction during recovery.

10. The computer-readable storage medium of claim 9, the problematic state comprising having the first resource manager in a prepared state with respect to the transaction while another resource manager is in a committed state with respect to the transaction.

11. The computer-readable storage medium of claim 8, the rule indicating that any resource manager having the transaction in a prepared state commit the transaction during recovery.

12. The computer-readable storage medium of claim 11, the problematic state comprising having the first resource manager in a state prior to the prepared state with respect to the transaction while another resource manager is in the prepared state with respect to the transaction.

13. A method implemented at least in part by computer executable instructions stored in a system memory of a computer and executed by a processing unit of the computer, the method comprising:

requesting that resource managers, executed at least in part by the processing unit, be prevented from entering a problematic state with respect to transactions affecting a set of resources stored on a set of resource stores accessible to the computer, the resource managers not prevented from entering into transactions that cause the resource managers not to enter a problematic state;

waiting until an earliest of a timeout period elapsing or until all of the resource managers that are in the problematic state exit the problematic state;

if the timeout period has not elapsed, receiving a notification that indicates that no resource managers are in the problematic state; and if the timeout period has elapsed, refraining from taking a shadow copy of the set of resources.

14. The method of claim 13, comprising:

creating a shadow copy of the set of resources; and indicating that the resource managers are allowed to enter the problematic state with respect to transactions affecting the set of resources after the shadow copy is created.

15. The method of claim 13, the problematic state comprising a state in which at least one of the resource managers is in a prepared state with respect to a transaction while at least one other of the resource managers is in a non-prepared state with respect to the transaction.

16. The method of claim 13, comprising, if the shadow copy of the set of resources is taken, performing a recovery on the shadow copy of the set of resources, the recovery performed without the involvement of a transaction manager.

17. The method of claim 13, the resource managers interacting with transaction managers that are in a hierarchy, and comprising notifying the transaction managers to prevent subordinate managers from entering the problematic state in an order based on the hierarchy.

18. The method of claim 17, a transaction manager at a first level in the hierarchy preventing subordinate managers from entering the problematic state before the subordinate managers prevent other managers from entering the problematic state.

19. In a computing environment having system memory of a computer configured to store computer executable instructions and a processing unit of a computer configured to execute the computer executable instructions, an apparatus, comprising:

a first resource manager, configured to manage at least one resource stored on at least one resource store accessible to the computer;

a consistency requestor, configured to request a consistent view of the at least one resource; and a transaction manager, configured to receive the request and in response thereto prevent the first resource manager from entering into a transaction after the request is received if the transaction would cause the first resource manager to enter a problematic state that makes the view inconsistent and allow the first resource manager to enter a second transaction after the request is received if the second transaction would not cause the first resource manager to enter a problematic state that makes the view inconsistent, the consistency requester configured to create a shadow copy of the at least one resource after the consistent view is available such that a recovery of the shadow copy can be performed without the involvement of the transaction manager, at least some of at least one of the first resource manager, the consistency requestor and the transaction manager implemented at least in part by the processing unit.

20. The apparatus of claim 19, the transaction manager configured to allow the first resource manager to proceed without rollback if it is involved in a transaction at the time the request is received that causes the first resource manager to be in a problematic state that makes the view inconsistent.

* * * * *